(12) United States Patent
Ide et al.

(10) Patent No.: US 11,468,866 B2
(45) Date of Patent: Oct. 11, 2022

(54) DISPLAY APPARATUS, CONTROL METHOD FOR CONTROLLING DISPLAY APPARATUS, AND STORAGE MEDIUM

(71) Applicant: SHARP KABUSHIKI KAISHA, Sakai (JP)

(72) Inventors: Masahiro Ide, Osaka (JP); Naohiro Kamitsuchihashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/321,934

(22) Filed: May 17, 2021

(65) Prior Publication Data

US 2022/0028354 A1 Jan. 27, 2022

(30) Foreign Application Priority Data

Jul. 22, 2020 (JP) .............................. JP2020-125795

(51) Int. Cl.
*G09G 5/10* (2006.01)
*G09G 3/32* (2016.01)

(52) U.S. Cl.
CPC ................. *G09G 5/10* (2013.01); *G09G 3/32* (2013.01); *G09G 2320/064* (2013.01); *G09G 2330/04* (2013.01); *G09G 2354/00* (2013.01)

(58) Field of Classification Search
CPC ...... G09G 5/10; G09G 3/32; G09G 2320/064; G09G 2330/04; G09G 2354/00; G09G 3/36; G09G 3/3406; G09G 2330/02; G09G 2360/16; G09G 2330/12
See application file for complete search history.

(56) References Cited

U.S. PATENT DOCUMENTS

| | | | | |
|---|---|---|---|---|
| 9,374,874 B1* | 6/2016 | Ewing | ..................... | G08C 17/02 |
| 2006/0164377 A1* | 7/2006 | Struebel | .................. | H05B 45/12 |
| | | | | 345/102 |
| 2006/0192927 A1* | 8/2006 | Ikeuchi | ............. | G02F 1/133382 |
| | | | | 353/119 |
| 2008/0158241 A1* | 7/2008 | Park | ........................ | G09G 3/006 |
| | | | | 345/589 |
| 2011/0270458 A1* | 11/2011 | Liu | ........................ | H01R 13/713 |
| | | | | 700/293 |
| 2013/0249431 A1* | 9/2013 | Shteynberg | ......... | H05B 45/3725 |
| | | | | 315/287 |
| 2013/0321486 A1* | 12/2013 | Cha | ....................... | G09G 3/3225 |
| | | | | 345/76 |

(Continued)

FOREIGN PATENT DOCUMENTS

| | | |
|---|---|---|
| JP | 8-68986 A | 3/1996 |
| JP | 2001-186762 A | 7/2001 |

(Continued)

*Primary Examiner* — Antonio Xavier
(74) *Attorney, Agent, or Firm* — ScienBiziP, P.C.

(57) ABSTRACT

A safety protection apparatus of a display apparatus includes an input voltage detection unit configured to generate input voltage information representing an input voltage, a luminance information generation unit (a dimming signal generation unit) configured to generate luminance information according to the input voltage, and a first check unit configured to check whether there is an abnormality in a correspondence relationship between the input voltage information and the luminance information.

14 Claims, 5 Drawing Sheets

(56) References Cited

U.S. PATENT DOCUMENTS

| | | | | |
|---|---|---|---|---|
| 2014/0340382 | A1* | 11/2014 | Sawabe | G09G 3/3614 345/212 |
| 2015/0277838 | A1* | 10/2015 | Gyllensward | G09G 5/02 345/694 |
| 2020/0076182 | A1* | 3/2020 | Huang | G09G 3/36 |
| 2020/0279514 | A1* | 9/2020 | Lee | G09G 1/005 |
| 2021/0264834 | A1* | 8/2021 | Lee | G09G 3/20 |

FOREIGN PATENT DOCUMENTS

| | | |
|---|---|---|
| JP | 2008016326 A | 1/2008 |
| JP | 2012160413 A | 8/2012 |

* cited by examiner

DISPLAY APPARATUS, CONTROL METHOD FOR CONTROLLING DISPLAY APPARATUS, AND STORAGE MEDIUM

BACKGROUND

1. Field

The present disclosure relates to a display apparatus, a control method for controlling a display apparatus, and a storage medium.

2. Description of the Related Art

Japanese Unexamined Patent Application Publication No. 2001-186762 (published on Jul. 6, 2001) discloses a power supply apparatus for supplying power to a display apparatus having a backlight. This power supply apparatus includes a power supply circuit and an input voltage detector. The power supply circuit includes a booster circuit, a discharge lamp, and a control circuit.

The input voltage detector detects a voltage of a commercial power supply supplied from the outside of the power supply apparatus (hereinafter, this voltage is referred to as an input voltage).

The control circuit controls a rectified output voltage, which is a voltage applied to the discharge lamp, by controlling the gain of the booster circuit according to the input voltage detected by the input voltage detector. More specifically, when the input voltage is relatively small (for example, 100 V), a high voltage mode is employed, in which the rectified output voltage is set relatively high. When the input voltage is relatively large (for example, 200 V), a low voltage mode is employed, in which the rectified output voltage is set relatively low. As a result, the control circuit can prevent the luminance of the discharge lamp from becoming too high or too low even when the input voltage fluctuates.

However, when some trouble occurs in the control circuit, an abnormality may occur in which the operation mode adopted by the control circuit is not consistent with the input voltage. For example, there is a possibility that the control circuit adopts the low voltage mode although the input voltage is 200 V, which may cause the rectified output voltage to be excessively high.

A similar problem may also occur in a power supply apparatus of a display apparatus using a light emitting diode (LED) as a backlight instead of the discharge lamp. For example, there is a possibility that the control circuit adopts the high voltage mode although the input voltage is 100 V, which may cause the drive current supplied to the LED to be excessively high.

In view of the above, according to an aspect of the present disclosure, there is provided a safety protection technique capable of detecting an abnormality such as an inconsistency between the input voltage and the operation mode of the display apparatus that may occur due to some trouble.

SUMMARY

In an aspect, the present disclosure provides a display apparatus including an input voltage detection unit configured to detect an input voltage applied from an outside and generate input voltage information representing the input voltage, a luminance information generation unit configured to generate luminance information according to the input voltage represented by the input voltage information, and a first check unit configured to refer to the input voltage information and the luminance information and check whether there is an abnormality in a correspondence relationship between the input voltage information and the luminance information.

In an aspect, the present disclosure provides a control method for controlling a display apparatus, including detecting an input voltage applied from an outside, generating luminance information according to the input voltage, and performing a first check process including referring to the input voltage and the luminance information and checking whether there is an abnormality in a correspondence relationship between the input voltage and the luminance information.

In an aspect, the present disclosure provides a computer-readable storage medium storing a control program causing a computer to function as the display apparatus according to one of the aspects of the present disclosure.

DESCRIPTION OF THE EMBODIMENTS

Outline of Display Apparatus

Figure 6:
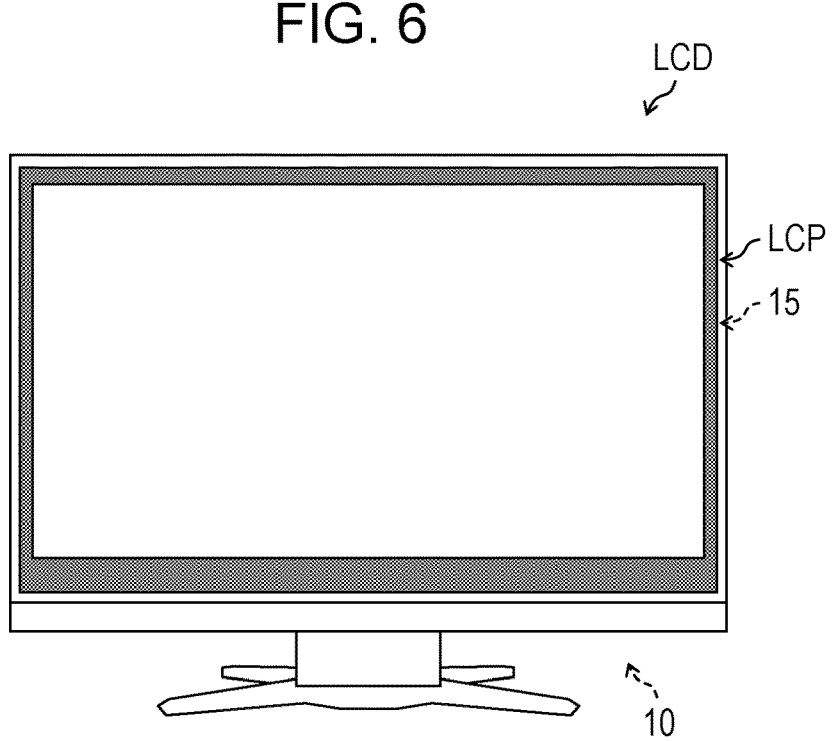
FIG. 6 is a schematic diagram of a liquid crystal display including a safety protection apparatus according to an embodiment of the present disclosure.

In an aspect, the present disclosure provides a safety protection apparatus (more specifically, for example, a safety protection apparatus 10 described later) for protecting a liquid crystal display widely used as a monitor for a television receiver and a personal computer. As shown in FIG. 6, a liquid crystal display LCD is a display apparatus using a backlight according to an aspect of the present disclosure. More specifically, the liquid crystal display LCD includes a backlight (more specifically, for example, a backlight 15), and a liquid crystal panel LCP. In the present embodiment, the backlight includes a plurality of light emitting diodes arranged in a matrix, and is configured to be area-driven by a PWM (Pulse Width Modulation) dimming method.

However, the display apparatus according to the aspect of the present disclosure is not limited to the liquid crystal display, which is a light transmissive display. For example, the display apparatus according to the aspect of the present disclosure may be a self-luminous display such as an organic LED (Light Emitting Diode) display or an organic EL (Electro Luminescence) display. Such a self-luminous display includes a plurality of self-luminous elements each being self-luminous such as organic LED elements or organic EL elements arranged in a matrix.

Furthermore, the liquid crystal display LCD supposed to include the safety protection apparatus according to the aspect of the present disclosure is configured to use, as a power supply, a commercial power supply which supplies AC power.

The voltage of the commercial power supply is set for each area. For example, in Japan, 100 V is used for general housing and offices, 200 V is for industrial use, and so on. In the United States, the voltage is 120 V or 240 V, depending on the state. In many European countries, the voltage is generally within a range from 220 V to 240 V. Hereinafter, a commercial power supply whose voltage is within a voltage range from 100 V to 120 V is referred to generically as a 100 V commercial power supply, while a commercial power supply whose voltage is within a voltage range from 200 V to 240 V is referred to generically as a 200 V commercial power supply.

The safety protection apparatus disclosed here is configured to be allowed to receive power supply from a 100 V commercial power supply and also allowed to receive power supply from a 200 V commercial power supply. More specifically, the safety protection apparatus disclosed here is configured such that power supplied to the liquid crystal display LCD is limited to a range within which the power consumption of the liquid crystal display LCD is lower than a rated power consumption regardless of whether the power is supplied from the 100 V commercial power supply or the 200 V commercial power supply. The rated power consumption is determined based on a rated input current allowed to be input to the liquid crystal display LCD from the commercial power supply.

Table 1A shown below describes a correspondence relationship among the operation mode, the input voltage, the power consumption, and the input current in a normal state, while Table 1B describes a correspondence relationship among the operation mode, the input voltage, the power consumption, and the input current in an abnormal normal state. An example of a rated current is 10 A, as shown in Table 1A. In this case, a dimming signal generation unit 12 (described later with reference to FIG. 1) of the safety protection apparatus operates as follows: (1) when the safety protection apparatus is connected to a 100 V commercial power supply, the dimming signal generation unit 12 detects that the voltage of the power supplied from the commercial power supply (that is, the input voltage) is 100 V, and employs mode 0 as the operation mode, and operates the liquid crystal display LCD such that the maximum power consumption does not exceed 1000 W; while (1) when the safety protection apparatus is connected to a 200 V commercial power supply, the dimming signal generation unit 12 detects that the input voltage is 200 V, and employs mode 1 as the operation mode, and operates the liquid crystal display LCD such that the maximum power consumption does not exceed 2000 W. Hereinafter, the mode 0 is also referred to as a low voltage mode, and the mode 1 is also referred to as a high voltage mode. In a case where the rated input current and rated power consumption are defined in the above-described manner, the luminance of the liquid crystal display LCD (which may be said as the luminance of the backlight) is higher in the mode 1 than in the mode 0.

TABLE 1A

IN NORMAL STATE

| OPERATION MODE | INPUT VOLTAGE | POWER CONSUMPTION | INPUT CURRENT |
|---|---|---|---|
| 0 (LOW VOLTAGE MODE) | 100 V | 1000 W | 10 A |
| 1 (HIGH VOLTAGE MODE) | 200 V | 2000 W | 10 A |

TABLE 1B

WHEN PROBLEM OCCURS IN DIMMING SIGNAL GENERATION UNIT 12

| OPERATION MODE | INPUT VOLTAGE | POWER CONSUMPTION | INPUT CURRENT |
|---|---|---|---|
| 0 (LOW VOLTAGE MODE) | 200 V | 1000 W | 5 A |
| 1 (HIGH VOLTAGE MODE) | 100 v | 2000 W | 20 A |

However, there is a possibility that some trouble occurs in the dimming signal generation unit 12 (described later with reference to FIG. 1), which may cause an abnormality to occur in which the operation mode adopted by the dimming signal generation unit 12 is not consistent with the input voltage. For example, as described in Table 1B describing the correspondence relationships in the case where a problem occurs in the dimming signal generation unit 12 there is a possibility that the dimming signal generation unit 12 incorrectly selects the mode 0 although the input voltage is 200 V, or the dimming signal generation unit 12 incorrectly selects the mode 1 although the input voltage is 100 V. In the former case, the input current is limited to 5A, and thus a problem caused by heat generation does not occur. However, in the latter case, the input current becomes 20 A, which is higher than the rated input current, and thus a problem due to heat generation may occur.

The safety protection technique according to the present disclosure can detect such an abnormality in which the input voltage and the above-described operation mode are inconsistent due to some trouble. Hereinafter, a display apparatus provided with the safety protection apparatus using the safety protection technique according to the one embodiment, a control method of controlling the display apparatus, and a control program are described below.

First Embodiment

Figure 1:
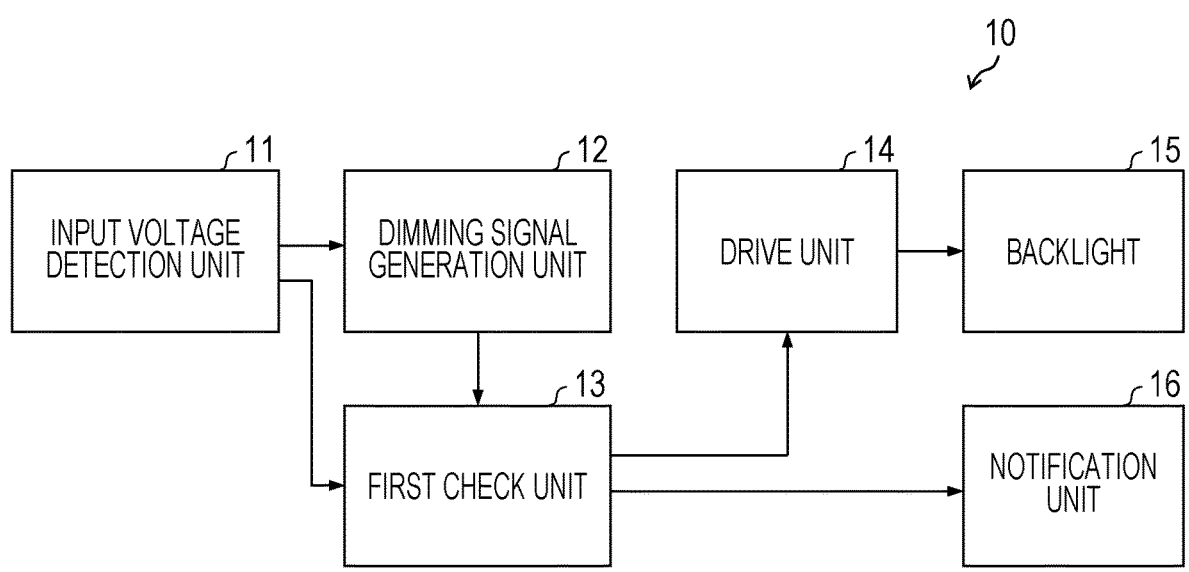
FIG. 1 is a block diagram of a safety protection apparatus according to a first embodiment of the present disclosure.

A safety protection apparatus 10 according to a first embodiment of the present disclosure is described below with reference to FIG. 1. FIG. 1 is a block diagram showing the safety protection apparatus 10.

As shown in FIG. 1, the safety protection apparatus 10 includes an input voltage detection unit 11, a dimming signal generation unit 12, a first check unit 13, a drive unit 14, a backlight 15, and a notification unit 16.

Backlight

The backlight 15 includes a plurality of directly-below type light emitting diodes arranged in a matrix over the entire surface of the liquid crystal panel LCP. In the present embodiment, the backlight 15 is area-driven (or partially driven) by the drive unit 14 (described later) using a PWM (Pulse Width Modulation) dimming method. Note that the backlight 15 is not limited to the directly-below type, and other types such as an edge type may be employed. Also note that the area-driving may not be employed.

The luminance of the plurality of light emitting diodes is determined by the drive current for driving each light emitting diode and the duty ratio in PWM. In the present embodiment, the drive current is set to an equal value for all of the plurality of light emitting diodes, and the duty ratio is controlled individually for each light emitting diode thereby achieving the area-driving of the plurality of light emitting diodes.

Input Voltage Detection Unit

The input voltage detection unit 11 generates voltage detection information representing a result of detecting the input voltage, which is a voltage of AC power input from the outside of the safety protection apparatus 10, and also generates input voltage information representing the input voltage.

In the present embodiment, the voltage detection information is a two-level voltage signal. More specifically, the voltage detection information is in a low state with 0 V when the input voltage is 100 V, while when the input voltage is 200 V, the voltage detection information alternately takes the low state and a high state with a predetermined voltage. In a period in which the input voltage is 200 V, the voltage detection information has a pulse waveform.

In the present embodiment, the input voltage information is a two-level voltage signal. More specifically, the input voltage information is in a low state with 0 V in a period in which the voltage detection information indicates 0 V, while in a period in which the voltage detection information has a pulse waveform, the input voltage information is in a high state with a predetermined voltage. Therefore, when the input voltage information is in the low state, it means that the input voltage is 100 V, while when the input voltage information is in the high state, it means that the input voltage is 200 V.

Specific examples of waveforms of the voltage detection information and the input voltage information will be described later with reference to FIG. 6.

Dimming Signal Generation Unit

The dimming signal generation unit 12 acquires the input voltage information directly from the input voltage detection unit 11. The dimming signal generation unit 12 sets the operation mode to either the mode 0 or the mode 1 according to the input voltage represented by the input voltage information. The mode 0 is an operation mode employed when the input voltage is 100 V, while the mode 1 is an operation mode employed when the input voltage is 200 V. The dimming signal generation unit 12 generates a dimming signal corresponding to the luminance of the backlight 15 according to the selected operation mode. The dimming signal is an example of luminance information representing the luminance of the backlight 15. The dimming signal generation unit 12 is an example of a luminance information generation unit that generates luminance information.

As described above, the luminance of the backlight 15 is higher in the mode 1 than in the mode 0. Therefore, the dimming signal generation unit 12 generates a relatively low dimming signal when the operation mode is the mode 0 in which the input voltage information is in the low state, while when the operation mode is the mode 1 in which the input voltage information is in the high state, the dimming signal generation unit 12 generates a relatively high dimming signal.

The dimming signal generally represents the luminance of the plurality of light emitting diodes constituting the backlight 15, and the dimming signal may be read as a set value of the drive current of the plurality of light emitting diodes.

In the present embodiment, the dimming signal may not be a one-level signal but may take a plurality of values within a predetermined range for each of the mode 0 and the mode 1. This will be described later in an example of a modification.

Figure 2:
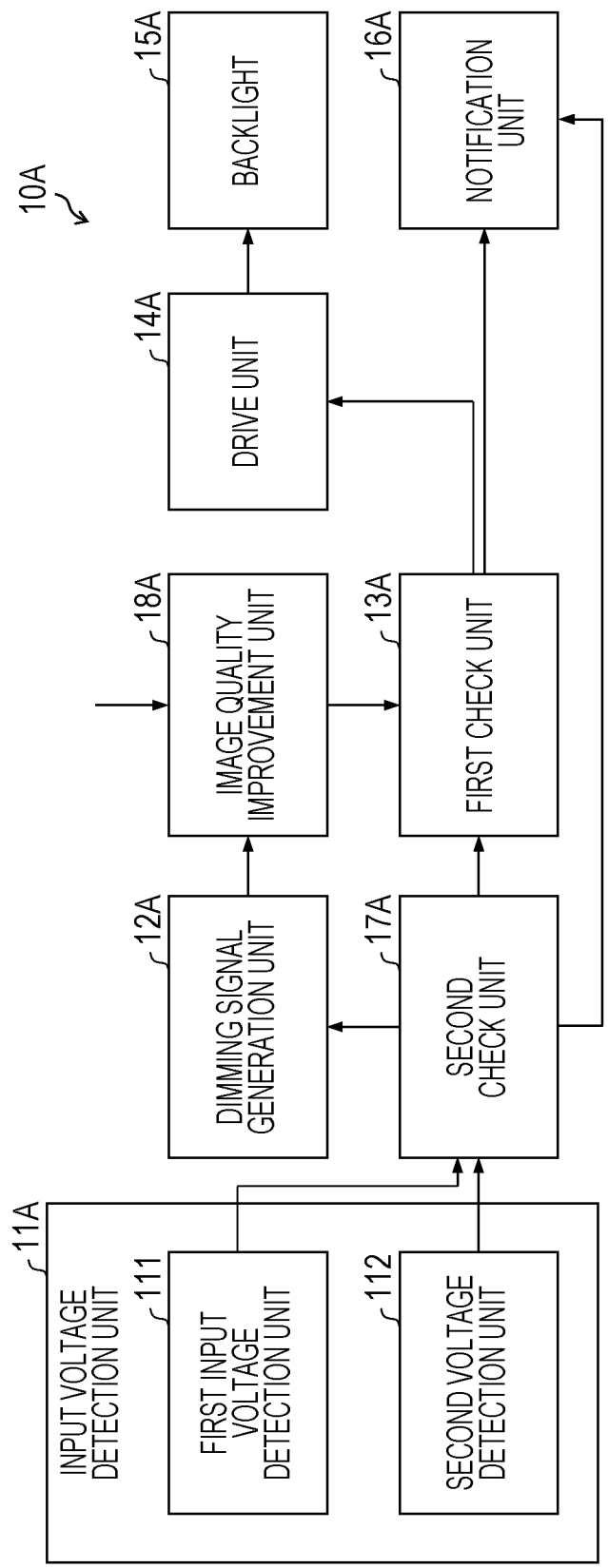
FIG. 2 is a block diagram illustrating a modification of the safety protection apparatus shown in FIG. 1.

The safety protection apparatus 10 may include an image quality improvement unit 18A as in the safety protection apparatus 10A shown in FIG. 2, which is an example of a modification. In this case, the image quality improvement unit 18A is capable of adjusting the dimming signal generated by the dimming signal generation unit 12. This will be described later in the example of the modification.

First Check Unit

The first check unit 13 acquires the input voltage information directly from the input voltage detection unit 11, and acquires the dimming signal directly from the dimming signal generation unit 12. However, another functional block may be interposed between the input voltage detection unit 11 and the first check unit 13. In this case, the first check unit 13 acquires the input voltage information from the input voltage detection unit 11 indirectly via the interposed functional block. Similarly, another functional block may be interposed between the dimming signal generation unit 12 and the first check unit 13. In this case, the first check unit 13 acquires the dimming signal from the dimming signal generation unit 12 indirectly via the interposed functional block. A drive unit 14 described later is an example of another functional block interposed between the dimming signal generation unit 12 and the first check unit 13. Another example is the image quality improvement unit 18A described later in the example of the modification.

The first check unit 13 refers to the input voltage information and the dimming signal, and checks whether there is an abnormality in the correspondence relationship between the input voltage information and the dimming signal. The first check unit 13 then generates first abnormality detection information indicating whether the abnormality exists. The first abnormality detection information takes a low state with 0 V when there is no abnormality, while it takes a high state with a predetermined voltage when there is an abnormality. In a case where the first check unit 13 determines that there is an abnormality, the first check unit 13 turns off or dims the backlight 15 (described later) via the drive unit 14 (described later).

As described above, the value of the dimming signal allowed to be taken in the mode 1 in which the input voltage is 200 V is larger than the value of the dimming signal allowed to be taken in the mode 0 in which the input voltage is 100 V. Therefore, in a case where some trouble occurs and this trouble causes the dimming signal generation unit 12 to select the mode 1 although the input voltage is 100 V, the value of the dimming signal can be larger than the predetermined upper limit of voltages allowed to be taken when the input voltage is 100 V. In such a case, the first check unit 13 determines that there is an abnormality in the correspondence relationship between the input voltage information and the dimming signal.

Drive Unit

The drive unit 14 acquires the dimming signal and the first abnormality detection information from the first check unit 13. In a case where the first abnormality detection information indicates that there is no abnormality, the drive unit 14 drives a plurality of light emitting diodes constituting the backlight 15 according to the dimming signal. In a case where the first abnormality detection information indicates that there is an abnormality, the drive unit 14 turns off the plurality of light emitting diodes. However, in this case, the drive unit 14 may dim the plurality of light emitting diodes according to a predetermined dimming signal instead of turning off the plurality of light emitting diodes. It is preferable that the predetermined dimming signal is included in a predetermined range of the dimming signal corresponding to the mode 0.

The drive unit 14 drives the liquid crystal panel LCP according to image information representing an image to be displayed on the liquid crystal display.

Notification Unit

The notification unit 16 is an example of the first notification unit, and acquires the first abnormality detection information from the first check unit 13. In a case where the first abnormality detection information indicates that there is no abnormality, the notification unit 16 performs nothing. In a case where the first abnormality detection information indicates that there is an abnormality, the notification unit 16 notifies a user that the abnormality exits.

In the present embodiment, the notification unit 16 employs a lamp as a notification means for notifying a user that there is an abnormality. By turning on or blinking this lamp, the notification unit 16 can notify the user that there is an abnormality. However, the notification means is not limited to the lamp. For example, a speaker may be used to notify, using a voice/sound, a user that there is an abnormality.

Self-Luminous Display

In the present embodiment, the safety protection apparatus 10 is described, by way of example, for the case where a liquid crystal display LCD is used as the display apparatus in which the safety protection apparatus 10 is disposed. However, as described above, the safety protection apparatus 10 can be installed also in a self-luminous display such as an organic LED (Light Emitting Diode) display or an organic EL (Electro Luminescence) display. Such a self-luminous display includes a plurality of self-luminous elements each being self-luminous such as organic LED elements or organic EL elements arranged in a matrix.

In a case where the safety protection apparatus 10 is disposed in a self-luminous display, the luminance information includes voltage information representing a FET gate-source voltage corresponding to a voltage applied to each of the plurality of self-luminous elements. The basic principle of the self-luminous element is similar to that of the LEDs constituting the backlight 15. That is, the luminance (load) of the self-luminous element depends on the current flowing through it. More specifically, as the current flowing through the self-luminous element is increased by increasing the gate-source voltage of an FET that drives self-luminous element, the luminance of the self-luminous element increases.

The first check unit 13 calculates a total voltage value given by the sum of the FET gate-source voltages represented by the voltage information included in the luminance information. If this total voltage value exceeds a predetermined threshold value, the first check unit 13 determines that there is an abnormality. The total voltage value is given by the sum of FET gate-source voltages associated with self-luminous elements located in a predetermined area among the plurality of self-luminous elements. Table 2 shows an example of a table used by the first check unit 13 in checking whether there is an abnormality in the correspondence relationship between the input voltage information and the luminance information.

TABLE 2

| OPERATION MODE | THRESHOLD VALUE OF SUM OF FET GATE-SOURCE VOLTAGES |
|---|---|
| 0 (100 V) | 500 |
| 1 (200 V) | 1000 |

The predetermined area in which the self-luminous elements are located is allowed to be appropriately defined. For example, the predetermined area may be the entire display area of the self-luminous display, or may be a part of the display area. In a case where a part of the display area is selected as the predetermined area, the part of the display area is allowed to be properly defined. For example, the part of the display area may be the display area of the self-luminous display excluding an outer edge portion of the display area, or may be a limited area around the center of the display area. When the threshold value to be compared with the total voltage value is set relatively small without changing the number of self-luminous elements included in the part of the display area, it is possible to obtain a relatively increased safety margin.

When the first check unit 13 determines that there is an abnormality in the correspondence relationship between the input voltage information and the luminance information, the first check unit 13 turns off or dims the plurality of self-luminous elements, and notifies, using the notification unit 16, a user of the existence of the abnormality.

Modifications

A safety protection apparatus 10A, which is a modification of the safety protection apparatus 10 shown in FIG. 1, is described below with reference to FIG. 2.

The safety protection apparatus 10A includes an input voltage detection unit 11A, a dimming signal generation unit 12A, a first check unit 13A, a drive unit 14A, a backlight 15A, and a notification unit 16A, respectively corresponding to the input voltage detection unit 11, the dimming signal generation unit 12, the first check unit 13, the drive unit 14, the backlight 15, and the notification unit 16, which are included in the safety protection apparatus 10. Unlike the safety protection apparatus 10, the safety protection apparatus 10A further includes a second check unit 17A and an image quality improvement unit 18A.

Input Voltage Detection Unit

As shown in FIG. 2, the input voltage detection unit 11A includes two input voltage detection units, that is, an input voltage detection unit 111 and an input voltage detection unit 112. Each of the input voltage detection units 111 and 112 has the same configuration as the input voltage detection unit 11 provided in the safety protection apparatus 10. Therefore, each of the input voltage detection units 111 and 112 generates voltage detection information indicating a result of detecting an input voltage, which is a voltage of AC power input from the outside of the safety protection apparatus 10, and also generates input voltage information indicating the input voltage. Hereinafter, the input voltage information generated by the input voltage detection unit 111 and the input voltage information generated by the input voltage detection unit 112 are respectively referred to as first input voltage information and second input voltage information. The input voltage detection units 111 and 112 respectively supply the first input voltage information and the second input voltage information to the second check unit 17A.

In the present embodiment, the input voltage detection unit 11A has been described by way of example for a case in which the input voltage detection unit 11A includes two input voltage detection units 111 and 112. However, there is no particular restriction on the number of input voltage detection units included in the input voltage detection unit 11A as long as the input voltage detection unit 11A includes a plurality of input voltage detection units. That is, an arbitrary plurality of input voltage detection units may be properly selected.

Second Check Unit

The second check unit 17A acquires the first input voltage information and the second input voltage information from the input voltage detection unit 11A. The second check unit 17A refers to the first input voltage information and the second input voltage information, and checks whether or not the first input voltage information and the second input voltage information are consistent with each other. The second check unit 17A generates second abnormality detection information indicating whether or not there is an abnormality. In a case where the first input voltage information and the second input voltage information are consistent with each other, the second check unit 17A determines that there is no abnormality. In a case where the first input voltage information and the second input voltage information are not consistent with each other, the second check unit 17A determines that there is an abnormality.

In a case where it is determined that there is no abnormality, the second check unit 17A integrates the first input voltage information and the second input voltage information, which are identical to each other, into single input voltage information, and supplies the resultant input voltage information to the dimming signal generation unit 12 and the first check unit 13A.

On the other hand, when it is determined that there is an abnormality, the second check unit 17A supplies the second input voltage information indicating that the abnormality exists to the first check unit 13A and the notification unit 16A.

As described above, since the input voltage detection unit 11 includes the first input voltage detection unit 111 and the second input voltage detection unit 112 which are configured in the same manner, the input voltage detection unit 11 has redundancy that allows it to handle a problem when the problem occurs in one of the input voltage detection units.

Image Quality Improvement Unit

The image quality improvement unit 18A acquires a dimming signal generated by the dimming signal generation unit 12. Furthermore, the image quality improvement unit 18A also acquires image information representing an image to be displayed by the liquid crystal display from the image processing unit (not shown in FIG. 2). Thereafter, to perform an area-driving operation, the image quality improvement unit 18A analyzes an image pattern of the image represented by the image information, and determines a duty ratio for each of the light emitting diodes constituting the backlight 15. The image quality improvement unit 18A generates duty ratio information indicating a duty ratio for each of the light emitting diodes, and combines the resultant duty ratio information into the dimming signal.

However, the process performed by the image quality improvement unit 18A is not limited to the process described above. For example, the image quality improvement unit 18A may include a process of up-converting the image represented by the image information. In another example, the image quality improvement unit 18A may include a process of rearranging a time-serial order of the duty ratios included in the dimming signal from an order according to raster scan to an order in which the backlight 15 and the liquid crystal panel LCP are actually driven.

The image quality improvement unit 18A supplies the dimming signal, having been subjected to the process described above and including the duty ratio information, to the first check unit 13A.

Dimming Signal Generation Unit

The dimming signal generation unit 12A generates, in a similar manner to the dimming signal generation unit 12, a dimming signal including information indicating the luminance of each of the light emitting diodes constituting the backlight 15 in accordance with the input voltage indicated by the input voltage information. The luminance of each of the light emitting diodes can be read as the drive current for driving each light emitting diodes. Therefore, in the present modification, the dimming signal includes drive current information indicating a drive current for driving each of the light emitting diodes.

The dimming signal generated by the dimming signal generation unit 12A is not limited to having only one value in each of the mode 0 and the mode 1, but may take a plurality of values within a predetermined range. The dimming signal generation unit 12A selects a value of the dimming signal from the range predetermined for each of the mode 0 and the mode 1 depending on the luminance or the display mode of the liquid crystal display preset by a user. That is, in the present modification, in controlling the plurality of light emitting diodes, the dimming signal is allowed to take a value selected from the predetermined range depending on the luminance of each of the light emitting diodes.

First Check Unit

The first check unit 13A acquires the input voltage information from the second check unit 17A. That is, the first check unit 13A acquires the input voltage information from the input voltage detection unit 11B indirectly via the second check unit 17A.

The first check unit 13A also acquires the dimming signal including the duty ratio information from the image quality improvement unit 18A. That is, the first check unit 13A acquires the dimming signal from the dimming signal generation unit 12 indirectly via the image quality improvement unit 18A.

As with the first check unit 13A, the first check unit 13 refers to the input voltage information and the dimming signal, checks whether there is an abnormality in a correspondence relationship between the input voltage information and the dimming signal, and generates first abnormality detection information indicating whether there is an abnormality. Note that in the present modification, the dimming signal includes duty ratio information. The first check unit 13A calculates a total duty value indicating the sum of duty ratios indicated by the duty ratio information, and determines whether the calculated total duty value is larger than a predetermined threshold value. If the total duty value is larger than the predetermined threshold value, the first check unit 13A determines that there is an abnormality. Note that the total duty value is the sum of duty ratios calculated separately for the respective light emitting diodes. Table 3 shows a table used by the first check unit 13A in checking whether there is an abnormality in the correspondence relationship between the input voltage information and the dimming signal. As shown, the threshold value of the total duty value is determined depending on the drive current.

TABLE 3

| INPUT | | OUTPUT |
|---|---|---|
| OPERATION MODE | SET VALUE OF DRIVING CURRENT | THRESHOLD VALUE OF SUM OF DUTY RATIOS |
| 0 (100 V) | 1 | 60 |
|  | 2 | 60 |
|  | ... | ... |
|  | 100 | 1000 |
| 1 (200 V) | 1 | 120 |
|  | 2 | 120 |
|  | ... | ... |
|  | 100 | 1000 |

In Table 3, a column of "input" includes a sub-column of "operation mode" corresponding to input voltage information and a sub-column of "set value of drive current" corresponding to a plurality of light emitting diodes. In Table 3, a column of "output" describes the threshold value of the total duty value for each set value of the drive current defined for each operation mode.

Using such a table by the first check unit 13A makes it possible for the first check unit 13A to correctly check whether there is an abnormality in the correspondence relationship between the input voltage information and the dimming signal even in a case where the backlight 15A is formed using a plurality of light emitting diodes and area-driving is performed using the PWM dimming method.

As described above, the safety protection apparatus 10 can be installed also in a self-luminous display such as an organic LED (Light Emitting Diode) display or an organic EL (Electro Luminescence) display. In this case, parameters described in the table used by the first check unit 13A are to be changed such that the set values of the drive currents are replaced by the set values of the FET gate-source voltages, and the threshold value of the total duty ratios is replaced with the threshold value of the total voltage. In this case, the luminance information includes voltage information indicating the FET gate-source voltage corresponding to the voltage applied to each of the plurality of self-luminous elements, and the threshold value is determined to a value corresponding to the FET gate-source voltage.

Drive Unit

The drive unit 14A, as with the drive unit 14, acquires the dimming signal and the first abnormality detection information from the first check unit 13A. In a case where the first abnormality detection information indicates that there is no abnormality, the drive unit 14A drives the plurality of light emitting diode constituting the backlight 15A according to the dimming signal. In a case where the first abnormality detection information indicates that there is an abnormality, the drive unit 14A turns off or dims the plurality of light emitting diodes.

Note that the dimming signal acquired by the drive unit 14A from the first check unit 13A includes the duty ratio information. The drive unit 14A drives separately each of predetermined areas of the backlight 15A by the PWM dimming method according to the duty ratio information.

Backlight

The backlight 15A is configured in a similar to the backlight 15 except that the backlight 15A is area-driven using the PWM dimming method. Therefore, in the present modification, a further description of the backlight 15A is omitted.

Notification Unit

As with the notification unit 16, the notification unit 16A is an example of the first notification unit. The notification unit 16A acquires the first abnormality detection information from the first check unit 13A. In the present modification, a further description of the process related to the first abnormality detection information by the notification unit 16A is omitted.

The notification unit 16A is also an example of the second notification unit, and the notification unit 16A acquires the second abnormality detection information from the second check unit 17A. In a case where the second abnormality detection information indicates that there is no abnormality, the notification unit 16A performs nothing. In a case where the second abnormality detection information indicates that there is an abnormality, the notification unit 16A notifies a user that the abnormality exists.

In the present modification, as with the notification unit 16, the notification unit 16A uses a lamp as a notification means that notifies a user that there is an abnormality. Note that when the notification unit 16A provides a notification, the lamp is turned on or blinked in a different manner depending on whether the first abnormality detection information or the second abnormality detection information indicates that there is an abnormality. This allows the user to know which of the first abnormality detection information and the second abnormality detection information indicates the abnormality based on the manner in which the lamp is turned on or blinked.

In the present modification, the notification unit 16A serves as both the first notification unit and the second notification unit. However, the first notification unit and the second notification unit may be realized by separate notification units.

Examples of Implementations

Figure 3:
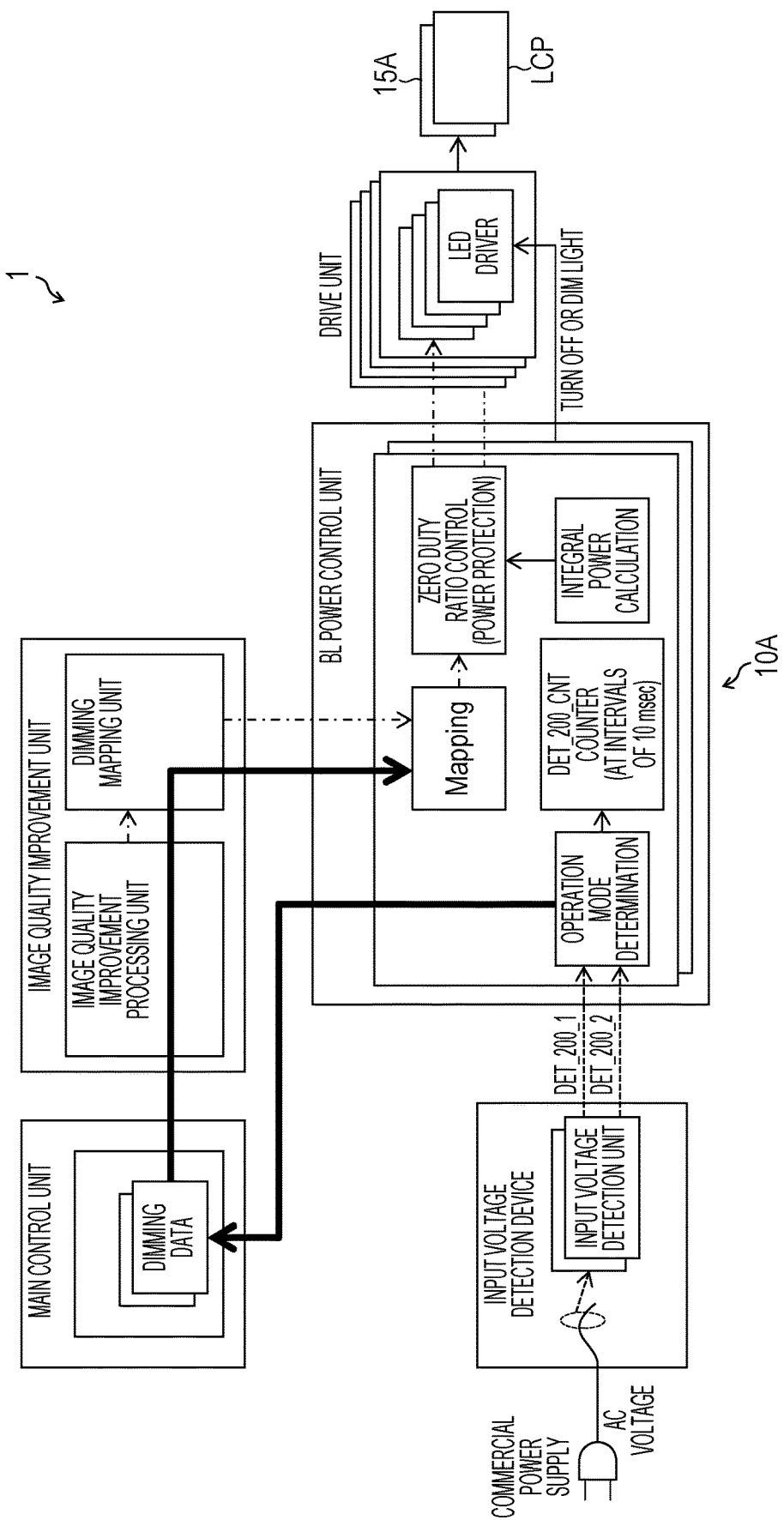
FIG. 3 is a block diagram illustrating an example of an implementation of the modified safety protection apparatus shown in FIG. 2.
Figure 4:
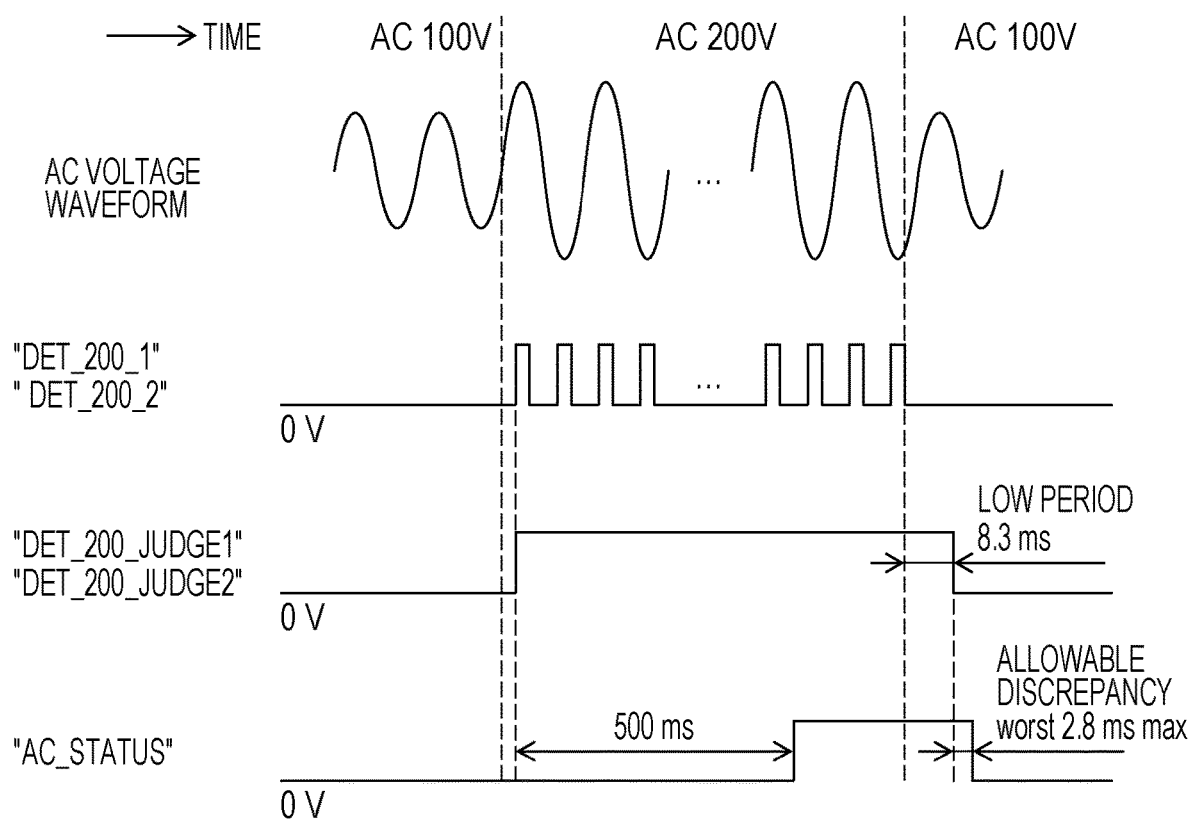
FIG. 4 is a timing chart of signals processed by a BL power control unit provided in the example of the implantation of the modification shown n FIG. 2.

A liquid crystal display 1 is described below with reference to FIGS. 3 and 4. This liquid crystal display 1 includes the safety protection apparatus 10A shown in FIG. 2 implemented as an example. FIG. 3 is a block diagram illustrating the example of the implementation of the safety protection apparatus 10A. FIG. 4 is a timing chart of signals processed by the BL power control unit provided in the example of the implementation of the safety protection apparatus 10A. The signals shown in FIG. 4 includes an input voltage of AC power supplied from a commercial power supply, voltage detection information, input voltage information, and abnormality detection information.

In the present example of the implementation, a description is given below as to the correspondence relationship of the respective functional blocks of the safety protection apparatus 10A shown in FIG. 2 with integrated circuits (IC chips) constituting the safety protection apparatus 10A in the example of the implementation.

As shown in FIG. 3, the liquid crystal display 1 includes the safety protection apparatus 10A and the liquid crystal panel LCP.

The safety protection apparatus 10A in the example of the implementation includes an outlet plug connected to a commercial power supply, an input voltage detection device, a BL power control unit, a main control unit, an image quality improvement unit, a PSU, a drive unit, and a backlight 15A. In the present example of the implementation, the input voltage detection device, the BL power control unit, the main control unit, the image quality improvement unit, the PSU, and the drive unit are each realized using an integrated circuit.

The input voltage detection device corresponds to the input voltage detection unit 11A. The input voltage detection device includes two integrated circuits respectively corresponding to two input voltage detection units, that is, input voltage detection units 111 and 112. Each of the two input voltage detection units generates voltage detection information DET_200_1 and voltage detection information DET_200_2, and then further generates first input voltage information DET_200_JUDGE1 and second input voltage information DET_200_JUDGE2 (see FIG. 4). Note that FIG. 4 shows a state in which there is no error in any of the two input voltage detection units. Therefore, in this case, the two pieces of voltage detection information generated by the two input voltage detection units are identical to each other, and the two pieces of input information generated by the two input voltage detection units are identical to each other.

In the present example of the implementation, each of the input voltage detection units sets the input voltage information such that in a case where the voltage detection information indicates a value of 0 V, the input voltage information is set to a low state with a voltage of 0 V, while in a case where the voltage detection information indicates a value other than 0 V, the input voltage information is set to a high state with a predetermined voltage. In a case where the voltage detection information changes into the low state, if the voltage detection information remains in the low state over a following predetermined period after the transition to the low state (8.3 ms in the present embodiment), each of the input voltage detection units sets the input voltage information into the low state.

The BL power control unit is an integrated circuit including the second check unit 17A and the first check unit 13A.

The BL power control unit refers to the first input voltage information DET_200_JUDGE1 and the second input voltage information DET_200_JUDGE2. If DET_200_1 and DET_200_2 are not identical to each other, the BL power control unit determines that there is an abnormality.

In a case where DET_200_JUDGE1 and DET_200_JUDGE2 are identical to each other, the main control unit generates operation mode information AC_STATUS indicating an operation mode according to the input voltage indicated by DET_200_JUDGE1 and DET_200_JUDGE2. AC_STATUS is a two-level voltage signal whose level is determined such that when the operation mode is mode 0, AC_STATUS takes the low state with a voltage of 0 V, while when the operation mode is mode 1, AC_STATUS takes the high state with a predetermined particular voltage. In the present example of the implementation, the main control unit determines the operation mode as shown in FIG. 4 and Table 4.

Thereafter, the main control unit generates the dimming signal depending on the operation mode.

TABLE 4

| D_200_JUDGE1 | D_200_JUDGE2 | AC_STATUS |
|---|---|---|
| HIGH | HIGH | WHEN BOTH REMAIN HIGH OVER 500 ms, STATE IS CHANGED FROM LOW TO HIGH (TO AC 200 V MODE) |
| HIGH | LOW | WHEN INCONSISTENCY CONTINUES OVER 2.8 msec, ABNORMALITY NOTIFICATION IS ISSUED (IF HIGH, THEN IT IS CHANGED TO LOW) |
| LOW | HIGH | |
| LOW | LOW | WHEN BOTH ARE LOW, STATE IS CHANGED FROM HIGH TO LOW (MODE EXITS AC 200 V MODE) |

The image quality improvement unit corresponds to the image quality improvement unit 18A. In the present example of the implementation, the image quality improvement unit includes an integrated circuit functioning as the image quality improvement processing unit and the dimming mapping unit. To perform an area-driving operation, the image quality improvement processing unit determines a duty ratio for each of the light emitting diodes constituting the backlight 15A, generates duty ratio information indicating the determined duty ratio, and combines the resultant duty ratio information into the dimming signal. Furthermore, the image quality improvement processing unit up-converts the image represented by the image information. The dimming mapping unit rearranges a time-serial order of the duty ratios included in the dimming signal from an order according to raster scan to an order in which the backlight 15 and the liquid crystal panel LCP are actually driven.

The BL power control unit acquires the dimming signal generated by the main control unit and including the duty ratio information combined, by the image quality improvement unit into the dimming signal. The BL power control unit checks whether there is an abnormality in a correspondence relationship between the input voltage information and the dimming signal.

The drive unit corresponds to the drive unit 14A.

The backlight 15A corresponds to the backlight 15A of the safety protection apparatus 10A shown in FIG. 2.

Second Embodiment

Figure 5:
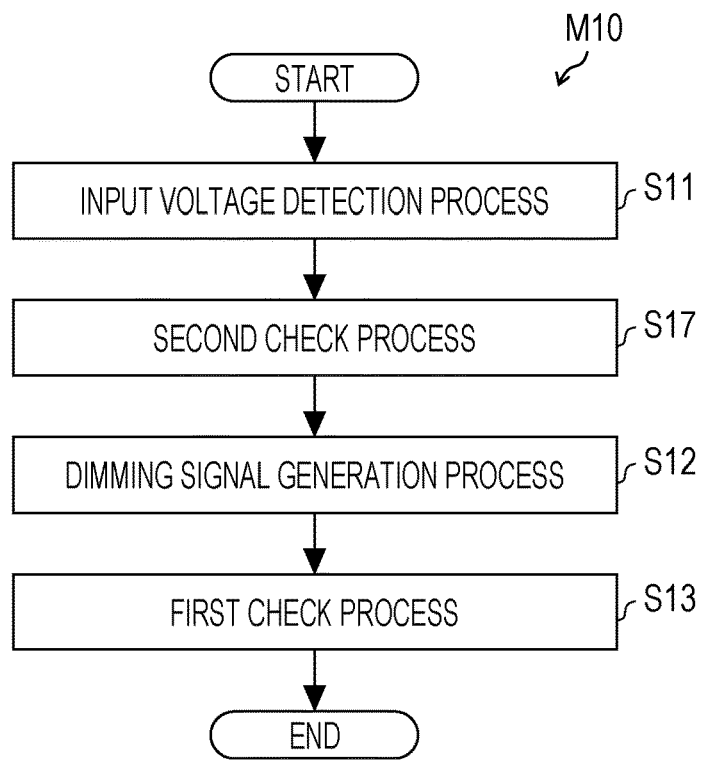
FIG. 5 is a flowchart illustrating a method of controlling a safety apparatus according to second embodiment of the present disclosure.

A control method M10 according to a second embodiment of the present disclosure is described below with reference to FIG. 5. The control method M10 control a liquid crystal display, which is one type of display apparatus. FIG. 5 is a flowchart indicating the control method M10 for controlling the liquid crystal display. The control method M10 for controlling the liquid crystal display represents processes executed by units included in the safety protection apparatus 10A shown in FIG. 2.

As shown in FIG. 5, the control method M10 for controlling the liquid crystal display includes an input voltage detection process S11, a second check process S17, a dimming signal generation process S12, and a first check process S13. The input voltage detection process S11 the second check process S17, the dimming signal generation process S12 and the first check process S13 respectively correspond to the processes executed by the input voltage detection unit 11A, the second check unit 17A, the dimming signal generation unit 12A, and the first check unit 13A, described above in the modification. Therefore, these processes according to the present embodiment are described below only briefly.

As described above in the modification, the backlight 15A includes a plurality of light emitting diodes arranged in a matrix and is configured to be area-driven using a PWM (Pulse Width Modulation) dimming method. The dimming signal, which is one type of luminance information, includes duty ratio information representing a duty ratio at which to drive each of the plurality of light emitting diode.

The input voltage detection process S11 is a process of detecting an input voltage of AC power input from the outside of the safety protection apparatus 10A, and generating first input voltage information and second input voltage information.

The second check process S17 refers to the first input voltage information and the second input voltage information, checks whether the first input voltage information and the second input voltage information are consistent with each other, and generates second abnormality detection information indicating whether there is an abnormality.

The dimming signal generation process S12 is an example of a luminance information generation step. More specifically it is a process of, in a case where the second check process S17 determines that there is no abnormality, generating a dimming signal according to the input voltage detected in the input voltage detection process S11.

The first check process S13 is a process of referring to the input voltage detected in the input voltage detection process S11 and the dimming signal generated in the dimming signal generation process S12, and checking whether there is an abnormality in the correspondence relationship between the input voltage and the dimming signal. In the first check process S13, as in the process performed by the first check unit 13A shown in FIG. 2, the total duty value, which is the sum of duty ratios represented by the duty ratio information, is calculated, and, if the calculated total duty value is larger than a predetermined threshold value, it is determined that there is an abnormality.

The control method M10 may be configured so as to control a self-luminous display, which is one type of display apparatus. The self-luminous display is a general term for a display including a plurality of self-luminous elements which emit self-luminous light and arranged in a matrix. Examples of self-luminous displays include an organic LED display and an organic EL display.

In this case, the luminance information includes voltage information representing voltages applied to the respective self-luminous elements. In the first check step S13, in a case where the total voltage value, which is the sum of voltages of a plurality of self-luminous elements located in a predetermined particular area among the plurality of self-luminous elements, is larger than a predetermined threshold value, it is determined that there is an abnormality.

Examples of Implementations by Software

Control blocks (in particular, the first check unit (13, 13A) and the second check unit 17A) of the safety protection apparatus (10, 10A) provided in the display apparatus may be realized by logic circuits (hardware) formed in an integrated circuit (an IC chip) or the like, or may be realized by software.

In the latter case, the safety protection apparatus (10, 10A) includes a computer that executes a program instruction, which is software realizes each function. The computer includes at least one processor (a control apparatus) or the like and at least one computer-readable storage medium in which the program is stored. In the computer, the processor reads the program from the storage medium and executes the program, thereby achieving an aspect of the present disclosure. For example, a CPU (Central Processing Unit) may be used as the processor. The storage medium may be a "non-transitory tangible medium", such as a read-only memory (ROM), a tape, a disk, a card, a semiconductor memory, a programmable logic circuit, or the like. A RAM (Random Access Memory) or the like for loading the program may also be provided. Alternatively, the program may be supplied to the computer via a transmission medium (a communication network, a broadcast wave, or the like) capable of transmitting the program. Note that an aspect of the present disclosure may also be realized in the form of a data signal embedded in a carrier wave such that the program is embodied by electronic transmission.

Summary of Embodiments

In a first aspect, the present disclosure provides a safety protection apparatus (10, 10A) disposed in a display apparatus, including an input voltage detection unit (11, 11A) configured to detect an input voltage applied from an outside and generate input voltage information representing the input voltage, a luminance information generation unit (a dimming signal generation unit (12, 12A)) configured to generate luminance information according to the input voltage represented by the input voltage information, and a first check unit (13, 13A) configured to refer to the input voltage information and luminance information, and check whether there is an abnormality in a correspondence relationship between the input voltage information and the luminance information.

In the safety protection apparatus configured in the above-described manner, the first check unit (13, 13A) is capable of checking whether there is an abnormality in the correspondence relationship between the input voltage information and the dimming signal. Therefore, when some problem occurs, which results in an inconsistency between the input voltage and the operation mode of the display apparatus, the safety protection apparatus (10, 10A) according to the first aspect of the present disclosure can detect such an abnormality.

In a second aspect, the present disclosure provides a safety protection apparatus (10A) disposed in a display apparatus, based on the first aspect described above, further including a backlight (15A) which includes a plurality of light emitting diodes arranged in a matrix and which is area-driven using a PWM (Pulse Width Modulation) dimming method, wherein the luminance information includes duty ratio information representing duty ratios at which the plurality of light emitting diodes are respectively to be driven, and the first check unit (13A) makes a determination such that when a total duty value indicating a sum of the duty ratios is larger than a predetermined threshold value, the first check unit (13A) determines that there is an abnormality.

Thus, also in a case where the backlight (15A) is configured using a plurality of light emitting diodes arranged in a matrix and the backlight (15A) is area-driven using the PWM (Pulse Width Modulation) dimming method, it is possible to detect an abnormality in consistency between the input voltage and the operation mode of the display apparatus.

In a third aspect, the present disclosure provides a safety protection apparatus (10, 10A) disposed in a display apparatus, based on the first aspect described above, further including a plurality of self-luminous elements which are each self-luminous and are arranged in a matrix, wherein the luminance information includes voltage information representing voltages to be applied to the respective self-luminous elements, and the first check unit makes a determination such that when a total voltage value indicating a sum of voltages applied to particular self-luminous elements located in a particular area among the plurality of self-luminous elements is larger than a predetermined threshold value, the first check unit determines that there is an abnormality.

Thus, also in a case where the display apparatus is a self-luminous display, it is possible to detect an abnormality in consistency between the input voltage and the operation mode of the display apparatus.

In a fourth aspect, the present disclosure provides a safety protection apparatus (10A) disposed in a display apparatus, based on the second or third aspect described above, in which in a case where the luminance information further includes drive current information representing drive currents that respectively drive the plurality of light emitting diodes, the threshold value is determined according to the drive currents, while in a case where the luminance information includes the voltage information representing voltages respectively applied to the plurality of self-luminous elements, the threshold value is determined according to the voltages.

In this aspect, regardless of whether the display apparatus is a liquid crystal display or a self-luminous display, it is possible to detect an abnormality in the consistency between the input voltage and the operation mode of the display apparatus even in the case where it is allowed to take a plurality of values as the drive current for driving each of the light emitting diodes or the voltage applied to each of the self-luminous elements depending on the luminance or the display mode of the display apparatus preset by a user.

In a fifth aspect, the present disclosure provides a safety protection apparatus (10, 10A) disposed in a display apparatus, based on one of the first to fourth aspects described above, further including a first notification unit (16, 16A) configured to notify a user of a status of the display apparatus, wherein in a case where there is an abnormality in the correspondence relationship between the input voltage information and the luminance information, the first check unit (13, 13A) turns off or dims the plurality of light emitting diodes or the plurality of self-luminous elements, and the first check unit (13, 13A) further notifies, using the notification unit (16, 16A), a user that the abnormality exists.

In this fifth aspect, it is possible to notify a user why the backlight (15, 15A) or the plurality of self-luminous elements are turned off or dimmed, which reduces perplexity that otherwise the user would feel.

In a sixth aspect, the present disclosure provides a safety protection apparatus (10A) disposed in a display apparatus, based on one of the first to fifth aspects described above, in which the input voltage detection unit (11A) includes a plurality of input voltage detection units (111, 112), and the safety protection apparatus (10A) further includes a second check unit (17A) configured to determine that there is an abnormality when there is an inconsistency among the input voltage information respectively output by the plurality of input voltage detection units (111, 112).

In this sixth aspect, the input voltage detection unit (11A) is capable of detecting an occurrence of a problem in one of the input voltage detection units (111 or 112), and the input voltage detection unit (11A) has redundancy that makes it possible to handle the problem in one of the input voltage detection units (111 or 112).

In a seventh aspect, the present disclosure provides a safety protection apparatus (10A) disposed in a display apparatus, based on the fifth aspect described above, further including a second notification unit (16A) configured to notify a user of a status of the display apparatus, wherein in a case where there is an inconsistency among the input voltage information respectively output by the plurality of input voltage detection units, the second check unit (17A) turns off or dims the plurality of light emitting diodes or the plurality of self-luminous elements, and the second check unit (17A) further notifies, using the second notification unit (16A), a user that there is an abnormality.

In this seventh aspect, it is possible to notify a user of a reason why the backlight (15A) or the plurality of self-luminous elements are turned off or dimmed, which reduces perplexity that otherwise the user would feel.

In an eighth aspect, the present disclosure provides a control method (a safety protection method M10) for controlling a display apparatus, including an input voltage detection process (S11) of detecting an input voltage applied from an outside, a luminance information generation step (S12) of generating luminance information according to the input voltage, and a first check process (S13) of referring to the input voltage and the luminance information and checking whether there is an abnormality in a correspondence relationship between the input voltage and the luminance information.

The control method according to this eighth aspect provides similar effects to those provided by the safety protection apparatus (10, 10A) in the display apparatus according to the first aspect of the present disclosure.

In a ninth aspect, the present disclosure provides a control method (a safety protection method M10) for controlling a display apparatus, based on the eighth aspect described above, in which the first check process (S13) checks where there is an abnormality based on the sum of duty ratios for respective light emitting diodes arranged in a matrix and area-driven by the PWM (Pulse Width Modulation) dimming method such that if the sum of duty ratios is larger than a predetermined threshold value, it is determined that there is an abnormality.

The control method according to this ninth aspect provides similar effects to those provided by the safety protection apparatus (10A) in the display apparatus according to the second aspect of the present disclosure.

In a tenth aspect, the present disclosure provides a control method (a safety protection method M10) for controlling a display apparatus, based on the eighth aspect described above, in which the display apparatus includes a plurality of self-luminous elements which are self-luminous and arranged in a matrix, the luminance information includes voltage information indicating voltages applied to the respective self-luminous elements, and the first check process checks whether there is an abnormality such that if a total voltage value indicating a sum of voltages applied respective to self-luminous elements located in a particular area among the plurality of self-luminous elements is larger than a predetermined threshold value, it is determined that there is an abnormality.

The control method according to this tenth aspect provides similar effects to those provided by the safety protection apparatus (10) in the display apparatus according to the fourth aspect of the present disclosure.

The display apparatus according to one of the aspects of the present disclosure may be realized by a computer. In this case, a control program (software elements) may control the computer to function as units of the display apparatus thereby achieving the display apparatus by the computer. In this case, the control program and a computer-readable storage medium in which the control program fall in the scope of the present disclosure.

The present disclosure contains subject matter related to that disclosed in Japanese Priority Patent Application JP 2020-125795 filed in the Japan Patent Office on Jul. 22, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
an input voltage detection circuit configured to detect an input voltage applied from an outside and generate input voltage information representing the input voltage;
a luminance information generation circuit configured to generate luminance information according to the input voltage represented by the input voltage information; and
a first check circuit configured to refer to the input voltage information and the luminance information and check whether there is an abnormality in a correspondence relationship between the input voltage information and the luminance information,
the display apparatus further comprising a backlight which includes a plurality of light emitting diodes arranged in a matrix and which is area-driven using a PWM (Pulse Width Modulation) dimming method,
wherein the luminance information includes duty ratio information representing duty ratios at which the plurality of light emitting diodes are respectively to be driven and drive current information representing drive currents that respectively drive the plurality of light emitting diodes, and
the first check circuit makes a determination such that when a total duty value indicating a sum of the duty ratios is larger than a predetermined threshold value, the first check circuit determines that there is an abnormality, and the threshold value is determined according to the drive currents.

2. The display apparatus according to claim 1, further comprising
a first notification circuit configured to notify a user of a status of the display apparatus,
wherein in a case where there is an abnormality in the correspondence relationship between the input voltage information and the luminance information, the first check circuit turns off or dims the plurality of light emitting diodes, and the first check circuit further notifies, using the first notification circuit, a user that the abnormality exists.

3. The display apparatus according to claim 2, wherein
the input voltage detection circuit includes a plurality of input voltage detection circuits, and
the display apparatus further comprises a second check circuit configured to determine that there is an abnormality when there is an inconsistency among the input voltage information respectively output by the plurality of input voltage detection circuits.

4. The display apparatus according to claim 1, wherein
the input voltage detection circuit includes a plurality of input voltage detection circuits, and
the display apparatus further comprises a second check circuit configured to determine that there is an abnormality when there is an inconsistency among the input voltage information respectively output by the plurality of input voltage detection circuits.

5. The display apparatus according to claim 4, further comprising
a second notification circuit configured to notify a user of a status of the display apparatus,
wherein in a case where there is an inconsistency among the input voltage information respectively output by the plurality of input voltage detection circuits, the second check circuit turns off or dims the plurality of light emitting diodes, and the second check circuit further notifies, using the second notification circuit, a user that there is an abnormality.

6. A display apparatus comprising:
an input voltage detection circuit configured to detect an input voltage applied from an outside and generate input voltage information representing the input voltage;
a luminance information generation circuit configured to generate luminance information according to the input voltage represented by the input voltage information; and
a first check circuit configured to refer to the input voltage information and the luminance information and check whether there is an abnormality in a correspondence relationship between the input voltage information and the luminance information,
the display apparatus further comprising
a plurality of self-luminous elements which are each self-luminous and are arranged in a matrix,
wherein the luminance information includes voltage information representing voltages to be applied to the respective self-luminous elements, and
the first check circuit makes a determination such that when a total voltage value indicating a sum of voltages applied to particular self-luminous elements located in a particular area among the plurality of self-luminous elements is larger than a predetermined threshold value, the first check circuit determines that there is an abnormality, and the threshold value is determined according to the voltages.

7. The display apparatus according to claim 6, further comprising
a first notification circuit configured to notify a user of a status of the display apparatus,
wherein in a case where there is an abnormality in the correspondence relationship between the input voltage information and the luminance information, the first check circuit turns off or dims the plurality of self-luminous elements, and the first check circuit further notifies, using the first notification circuit, a user that the abnormality exists.

8. The display apparatus according to claim 7, wherein
the input voltage detection circuit includes a plurality of input voltage detection circuits, and
the display apparatus further comprises a second check circuit configured to determine that there is an abnormality when there is an inconsistency among the input voltage information respectively output by the plurality of input voltage detection circuits.

9. The display apparatus according to claim 6, wherein
the input voltage detection circuit includes a plurality of input voltage detection circuits, and
the display apparatus further comprises a second check circuit configured to determine that there is an abnormality when there is an inconsistency among the input voltage information respectively output by the plurality of input voltage detection circuits.

10. The display apparatus according to claim 9, further comprising
a second notification circuit configured to notify a user of a status of the display apparatus,
wherein in a case where there is an inconsistency among the input voltage information respectively output by the plurality of input voltage detection circuits, the second check circuit turns off or dims the plurality of self-luminous elements, and the second check circuit further notifies, using the second notification circuit, a user that there is an abnormality.

11. A non-transitory computer-readable storage medium storing a control program causing a computer to function as the display apparatus according to claim 6,
wherein the program causes the program to function as the first check circuit.

12. A method of controlling a display apparatus, comprising:
detecting an input voltage applied from an outside;
generating luminance information according to the input voltage; and
performing a first check process including referring to the input voltage and the luminance information and checking whether there is an abnormality in a correspondence relationship between the input voltage and the luminance information,
wherein the display apparatus comprises a backlight which includes a plurality of light emitting diodes arranged in a matrix and which is area-driven using a PWM (Pulse Width Modulation) dimming method,
the luminance information includes duty ratio information representing duty ratios at which the plurality of light emitting diodes are respectively to be driven and drive current information representing drive currents that respectively drive the plurality of light emitting diodes, and
in the first check process, when a total duty value indicating a sum of the duty ratios is larger than a predetermined threshold value, an abnormality is determined, and the threshold value is determined according to the drive currents.

13. A non-transitory computer-readable storage medium storing a control program causing a computer to function as the display apparatus according to claim 1,
wherein the program causes the program to function as the first check unit circuit.

14. A method of controlling a display apparatus, comprising:
detecting an input voltage applied from an outside;
generating luminance information according to the input voltage; and
performing a first check process including referring to the input voltage and the luminance information and checking whether there is an abnormality in a correspondence relationship between the input voltage and the luminance information,
wherein the display apparatus comprises a plurality of self-luminous elements which are each self-luminous and are arranged in a matrix,
the luminance information includes voltage information representing voltages to be applied to the respective self-luminous elements, and
in the first check process, when a total voltage value indicating a sum of voltages applied to particular self-luminous elements located in a particular area among the plurality of self-luminous elements is larger than a predetermined threshold value, an abnormality is determined, and the threshold value is determined according to the voltages.

* * * * *